Dec. 29, 1959  W. H. FORD  2,918,800
IRRIGATING MACHINE
Filed Sept. 14, 1956  3 Sheets-Sheet 1
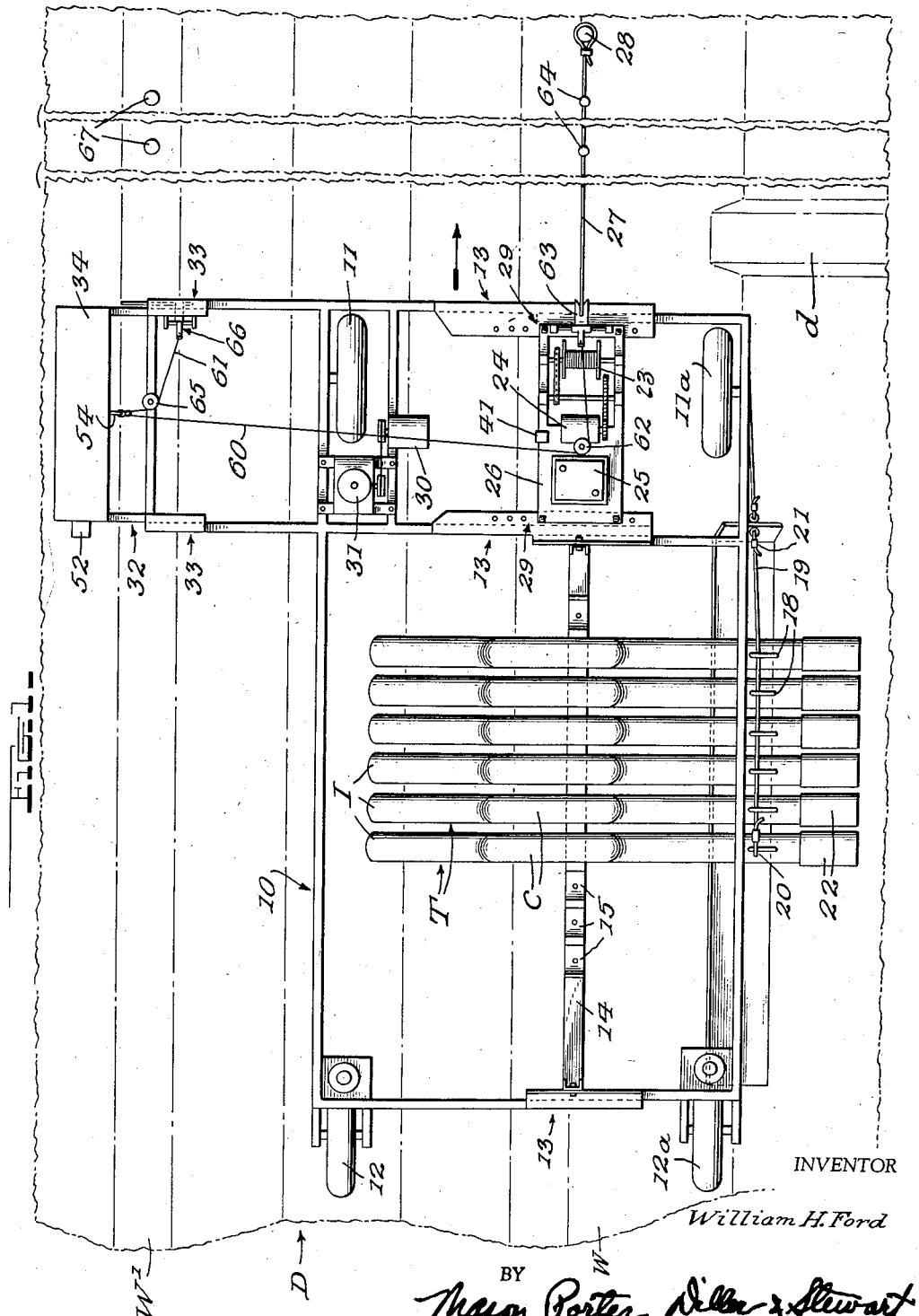
INVENTOR
William H. Ford
BY
Mason, Porter, Diller & Stewart
ATTORNEYS Dec. 29, 1959     W. H. FORD     2,918,800
IRRIGATING MACHINE
Filed Sept. 14, 1956     3 Sheets-Sheet 2
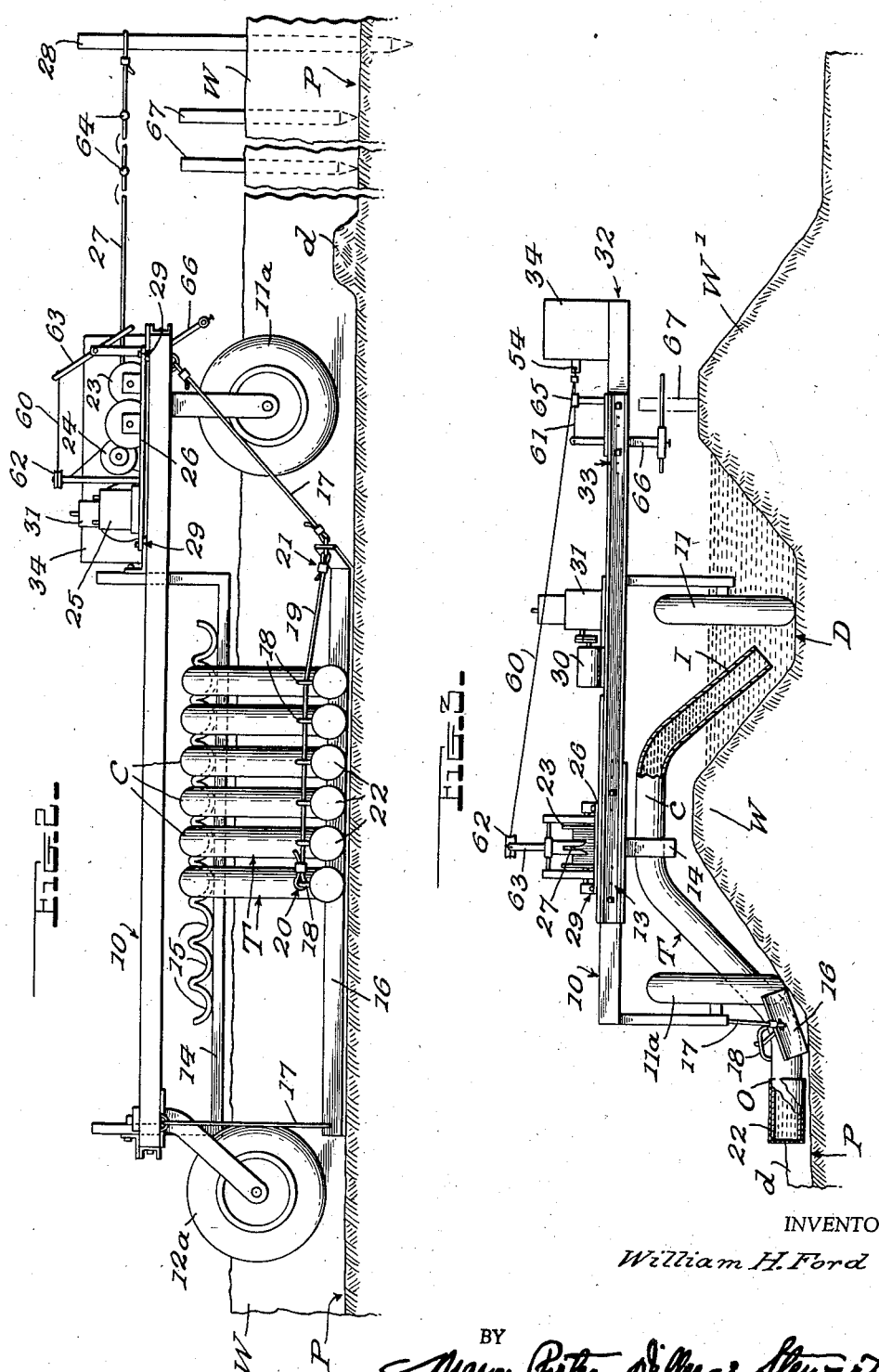
INVENTOR
William H. Ford
BY
ATTORNEYS

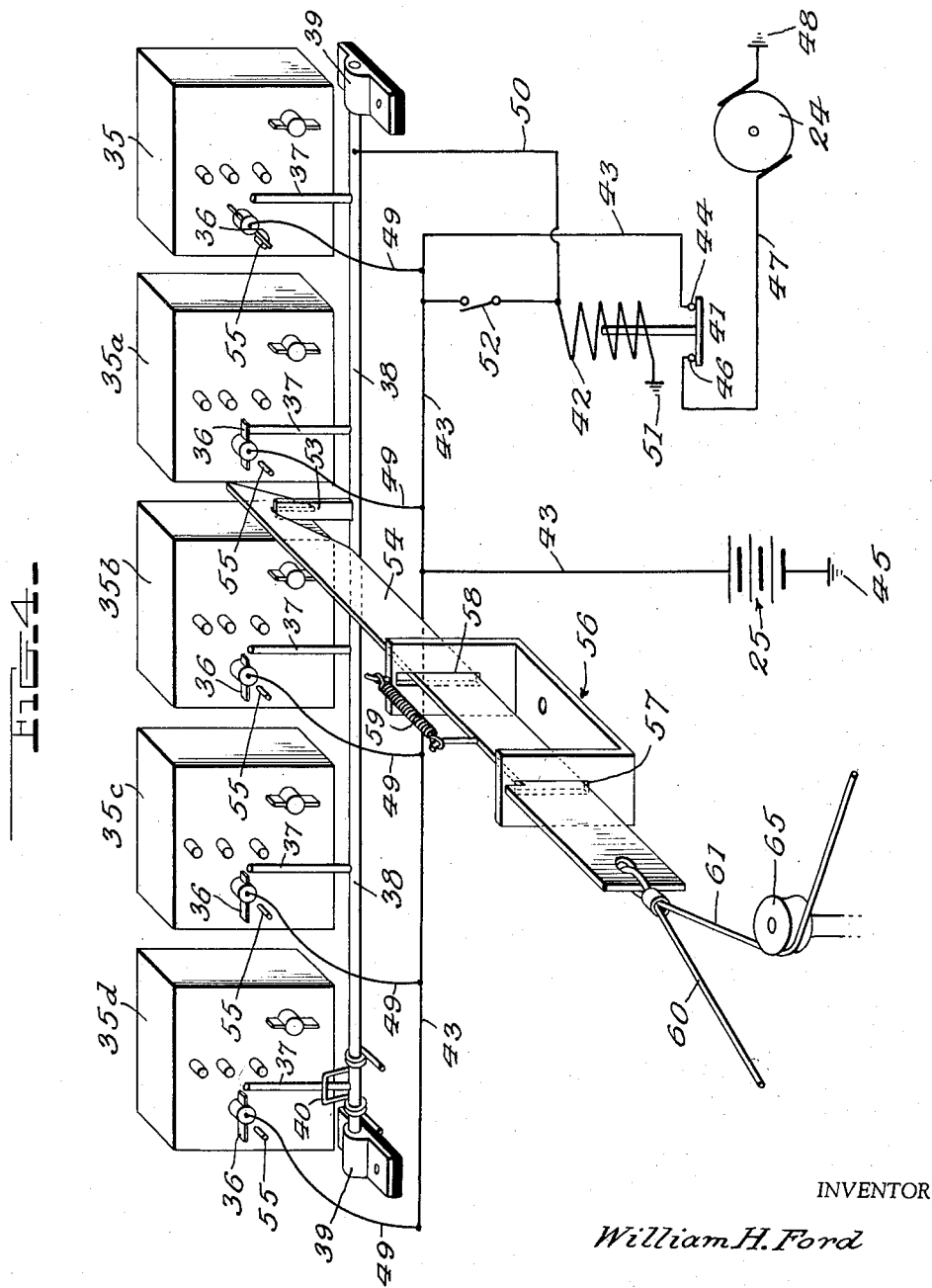

United States Patent Office 2,918,800
Patented Dec. 29, 1959

2,918,800

IRRIGATING MACHINE

William H. Ford, Center, Colo., assignor of one-half to William R. Bartlett, Center, Colo.

Application September 14, 1956, Serial No. 609,925

7 Claims. (Cl. 61—12)

In certain geographical areas where irrigation is used, it is customary to substantially level the land and use flood irrigation. This is accomplished by siphoning water from an irrigation ditch onto land planes extending laterally from the ditch. The land planes are separated by dikes and have a gentle decline away from the ditch. Arched siphon tubes are employed which are filled by submersion in the ditch water, one end of each tube being then kept submerged while the other end is temporarily closed and lifted over a wall of the ditch onto a land plane, the closed tube end being then opened to allow siphonic flow of water. Several siphon tubes are usually employed for flooding each land plane and when any plane has been flooded, these tubes must be re-closed, moved on to the next plane and then re-opened. These operations are commonly performed by hand and are very arduous. Moreover, the irrigation is often carried on both day and night and a large outlay is thus required for labor.

The present invention aims to provide a novel machine for performing the major part of the work, thus reducing fatigue and labor to the minimum.

In carrying out the above end, another object is to provide a novel mobile machine which carries the filled siphon tubes and automatically advances from each land plane to the next at the expiration of an adequate plane-flooding period.

The means for advancing the machine includes a (preferably electric) driving motor, and a further object is to provide novel time-controlled means for automatically bringing said motor into play at the expiration of each plane-flooding period, thereby advancing the machine to the next plane.

A still further object is to provide novel means for automatically stopping the motor when the machine reaches the desired position with respect to any land plane to which it has been advanced.

Another object is to provide the wheeled frame of the machine with novel means for supporting the siphon tubes and holding them in operative relation with the irrigating ditch.

Yet another object is to make novel provision for preventing the delivery ends of the siphon tubes from dragging on the land planes as the machine advances.

With the above and other objects in view that will hereinafter appear, the nature of the invention will be more clearly understood by reference to the following detailed description, the appended claims and the several views illustrated in the accompanying drawings.

In the drawings:

Figure 1 is a top plan view of the machine, an irrigation ditch, two of the land planes and one of the dikes being shown in broken lines.

Figure 2 is a side elevation.

Figure 3 is a front end view.

Figure 4 is a perspective view showing the time-controlled, motor-starting means and portions of the motor-stopping means associated therewith, a suitable wiring diagram being also included.

The construction disclosed may be considered as preferred and will be rather specifically described, but it is, of course, possible to make variations within the scope of the invention.

A suitable mobile frame 10 is provided having front wheels 11 and 11a and rear caster wheels 12 and 12a. The two wheels 11 and 12 are intended to travel on the bottom of the irrigation ditch D and the wheels 11a and 12a along the outer side of one of the ditch walls W, near the juncture of the latter with the land planes P. One of the dikes between the land planes is shown at d and these dikes are insufficiently high to interfere with the wheels 11a and 12a. The frame 10 is preferably of laterally extensible and retractable form and suitable adjusting provision is indicated at 13.

A longitudinal bar 14 is secured to the frame 10 to extend under the crown portions C of the arched siphon tubes T to support the latter in positions in which they extend over the ditch wall W with their inlet ends I submerged in the ditch water and with their delivery or outlet ends O disposed over the land planes P.

The bar 14 has longitudinally spaced U-shaped seats 15 for the tube crown portions C, and a ground-engaging runner 16 extends under the delivery ends O of said tubes to prevent them from dragging on the land planes P as the machine advances and to elevate said ends O whenever they must pass over one of the dikes d. This runner 16 is suitably connected front and rear with the frame 10, as shown at 17.

The ends O of the siphon tubes T have arched handles 18, and a tie line 19 is extended through said handles, the rear end of said tie line being secured at 20 to the rearmost handle and the front end of said tie line being secured at 21 to the front end of the runner 16. The runner 16 and tie line 19 thus coact with the bar 14 and its seats 15 in holding the siphon tubes T in operative relation with the ditch D. The tubes T, however, may be readily removed for immersion in the ditch water to fill said tubes whenever required.

Whenever the machine is being advanced, if it is found impossible to prevent breaking of the siphonic action during passage of the tubes over the dikes d, said tube ends may be capped at 22 or otherwise temporarily closed during such passage.

A winch 23, an electric motor 24 gear-and-chain connected with said winch, and a battery 25 are mounted on a base frame 26 which is secured upon the frame 10. The winch 23 winds a pull cable 27 to advance the machine, and the front end of said pull cable is anchored to the ditch wall W by means of a stake 28. Therefore, the base 26 is laterally adjustable at 29 to position the winch 23 in alignment with the stake 28 regardless of any main frame extension or retraction which may be effected at 13.

A generator 30 and gas engine 31 for driving the same, are mounted on the main frame 10 for recharging the battery 25 whenever necessary.

At its front end, the main frame 10 is provided with a lateral extension 32 to overlie the ditch wall W', said extension being preferably extensible and retractable at 33. This extension 32 carries a casing 34 within which there is (see Figure 4) a row of stationarily mounted alarm clocks 35, 35a, 35b, 35c and 35d, said clocks all having their backs disposed toward the longitudinal center of the machine. The alarm winding keys of the various clocks 35 constitute contacts 36 which are spring-driven one at a time by the usual clock mechanisms. These driven contacts are cooperable with contact arms 37 respectively, said contact arms 37 being secured to a rock shaft 38 mounted in bearings 39 in the housing 34. The rock shaft 38 extends longitudinally of the row of alarm clocks 35, 35a etc., and a spring 40 normally holds said rock shaft in such position that all of the contact arms 37 are in the paths of the cooperating driven contacts 36, respectively. Engagement of any driven contact 36 with the cooperating contact arm 37 serves to cause operation of the motor 24 which advances the machine. This result may be attained with any appropriate electrical circuit, one example of which is described below and illustrated in Figure 4.

A self-opening solenoid switch 41 is provided for completing the circuit of the motor 24, and the actuating coil 42 of said switch is energized by engagement of any driven contact 36 with the cooperating contact arm 37. A branched line 43 is shown extending from one terminal of the battery 25 to one contact 44 of the solenoid switch 41. The other terminal of the battery 25 is grounded at 45. The other contact 46 of the switch 41 is connected at 47 with one terminal of the motor 24 and the other terminal of this motor is grounded at 48. Suitable conductors 49 connect the driven contacts 36 with the line 43. The bearings 39 of the rock shaft 38 are insulated from the ground, and this rock shaft is connected at 50 with one terminal of the coil 42. The other terminal of this coil 42 is grounded at 51.

When any contact 36 is driven by its respective alarm mechanism into engagement with the cooperating contact arm 37 (see clock 35a for example), current flows from the battery 25 through 43, 49, 36, 37, 38 and 50 to the coil 42, through this coil to the ground and through the latter back to the battery 25. The solenoid switch 41 thus closes and current flows from the battery 25 through 43, 41 and 47 to the motor 24, through the latter to the ground and through this ground back to the battery. The motor 24 is thus operated to advance the machine to the next land plane P after flooding one plane. A suitably located and connected hand switch 52 is also provided for use when the machine is to be advanced independently of the time-controlled switch means.

The alarm mechanisms of the various clocks 35, 35a etc. are so set that clock 35 causes machine advance from the first land plane to the second, clock 35a causes machine advance from the second plane to the third and so on. After each advance of the machine, the circuit of the coil 42 is opened automatically to stop the motor 24 and remains open until closed by the next clock. The automatic means for breaking the circuit of the coil 42 is described below. Again, see Figure 4.

An arm 53 projects upwardly from the rock shaft 38 and a hook 54 is cooperable with said arm to rock said shaft in a direction to move the contact arms 37 out of the paths of the driven contacts 36. Thus, when any contact 36 has been driven into contact with the cooperating arm 37 (see clock 35a) and has thus started the motor 24, the subsequent rocking of the shaft 38 by means of the hook 54 will free the contact 36 from the contact arm 37 to stop the motor. The driven contact 36 will then resume movement to the extent permitted by a stop 55 (see clock 35).

The hook 54 extends transversely of the rock shaft 38 and is slidably mounted in the casing 34 by means of a U-shaped bracket 56, the arms of said bracket being formed with vertical slots 57 and 58 through which said hook extends. The slot 58 is sufficiently long to allow improved tilting of the hook 54 to allow said hook to ride off of the arm 53 when the latter has been pulled well back to an inclined position and has performed the function of stopping the motor. The spring 40 then returns the rock shaft 38 to its normal position. A spring 59 restores the hook 54 to normal position when the hook is later free to return after being pulled back.

Two pull lines 60 and 61 are connected to the hook 54. The line 60 extends around a sheave 62 and is connected to a trip lever 63 fulcrumed on the frame 10, said trip lever having a forked end engaging the pull cable 27. This cable 27 carries abutments 64 for the successive land planes respectively, and when the trip lever 63 is rocked by striking an abutment, it pulls on the pull line 60, thereby pulling the hook 54 to rock the shaft 38 and stop the machine.

The pull line 61 extends around a sheave 65 and is connected to a trip lever 66 on the frame 10, said trip lever 66 being successively cooperable with stakes 67 driven into the ditch wall W' and allotted one to each land plane. When the trip lever 66 strikes a stake 67 and is operated thereby, the line 61 pulls upon the hook 54 and rocks the shaft 38 to stop the machine.

While both trip levers 63 and 66, and both pull lines 60 and 61 may be incorporated in the same machine, as a precaution, either one of said trip levers and the associated pull line could well be employed without the other.

*Operation*

The siphon tubes T are filled and capped (see 22) at the first land plane P to be irrigated. These tubes are then mounted on the machine as seen in Figures 1 to 3 and the caps 22 are removed to allow said tubes to siphon water from the ditch D onto the plane. Either before or after the tube filling operation, the cable 27 is payed out from the winch 23 and anchored with the stake 28, to locate the abutments 64 centrally of the succeeding land planes to be irrigated. Also, assuming that the second trip lever 66 be employed, the cooperating stakes 67 are driven at proper positions. Also, the alarm mechanisms of the alarm clocks 35, 35a etc. are set and wound leaving the keys or contacts 36 spaced from the contact arms 37. The clock 35 is set to determine the length of time which the machine will dwell at the first plane; clock 35a is set to determine the dwell at the second land plane and so on. When the alarm mechanism of the clock 35 operates, its contact 36 is driven against the cooperating contact arm 37. This completes the circuit of the solenoid switch coil 42 and the switch 41 thus closes, thereby completing the circuit of the drive motor 24. This motor drives the winch 23 to wind the pull cable 27 and the machine is thus pulled forwardly until the trip lever 63 strikes the first abutment 64 and/or the trip lever 66 strikes the first stake 67. When this occurs, the pull line or lines 60, 61 pull upon the hook 54. This hook rocks the shaft 38 to move the contact arm 37, previously engaged by the driven contact 36, back from said driven contact 36. The drive motor circuit is thus broken and the machine stops at the second land plane. As soon as the arm 37 clears the driven contact 36, the latter moves on to the stop 55, the hook 54 disengages from the arm 53 and the spring 40 returns the rock shaft to normal position. After the predetermined dwell at the second land plane, the second clock 35a completes the drive motor circuit and the machine again advances. As this advance starts, the trip lever 63 and/or 66 is released and returns to normal position, thus freeing the hook 54, whereupon the spring 59 returns said hook to its normal position in engagement with the rock shaft arm 53. The machine is thus placed in readiness for advance to the third land plane and this advance is effected by the clock 35b at the expiration of a predetermined period of time. Advance to the succeeding land planes is caused by the clocks 35c and 35d and machine stopping in each case is effected in the same manner as above described. If, for any reason, it is necessary to advance the machine independently of the time-controlled switch means, the hand switch 52 is used.

If it is found that the siphonic action is completely broken and not merely momentarily interrupted as the siphon tubes pass over the dikes d, it will of course be necessary to cap the ends O during such passage.

From the foregoing, it will be seen that novel and advantageous provision has been disclosed for attaining the desired ends. However, attention is again invited to the possibility of making variations within the scope of the invention.

I claim:

1. In a machine for irrigating by conducting water through siphon tubes from an irrigation ditch onto land planes extending laterally from said ditch, a wheeled frame to travel along the ditch, water conducting siphon tubes mounted on said frame with their inlet ends positioned for submersion in the ditch water and their delivery ends positioned to overlie the land planes, means for closing the delivery ends of the tubes when necessary to prevent their desiphoning when the machine is being advanced from one land plane to the next plane, means for periodically advancing said frame and including a normally idle drive motor on said frame, a normally idle winch on said frame and driven by said motor when the latter is operated, a pull cable connected at one end to said winch to be wound thereon, means for anchoring the other end of said pull cable to the ground at a point in advance of the machine, time-controlled means on said frame for automatically causing operation of said drive motor at the expiration of predetermined periods of time each representing a plane-irrigating period, and means for automatically stopping said drive motor each time it has performed the function of advancing the machine to the next land plane to be irrigated.

2. An irrigation machine as set forth in claim 1, wherein the motor stopping means has an actuating element movably mounted on said frame, and a trip stake to be driven into the ground in advance of the machine to operate said actuating element at the required time.

3. An irrigation machine as set forth in claim 1, wherein the advancing means includes a normally idle electric drive motor, a battery on said frame for supplying current to said motor; the time-controlled means comprises switch means on said frame for completing the motor circuit at the expiration of each plane-irrigating period, and the means for automatically stopping the motor comprises circuit breaking means of the motor each time the motor has performed the function of advancing the machine to the next land plane to be irrigated.

4. A structure as specified in claim 3; said time-controlled switch means comprising a row of spring-driven mechanisms set to successively operate at the expiration of successive plane irrigating periods respectively, each of said mechanisms having a contact driven thereby, a rock shaft mounted on said frame and extending longitudinally of said row of mechanisms, contact arms secured to said rock shaft, and spring means acting on said rock shaft for yieldably holding said contact arms in the paths of said driven contacts respectively; said means for breaking the motor circuit including a hook mounted on said frame for sliding movement transversely of said rock shaft, said rock shaft having an arm normally engaged by said hook in readiness for turning said rock shaft to move said contact arms out of the paths of said driven contacts when said hook is slid in one direction, a pull line connected with said hook for sliding it in said one direction, a trip on said frame and connected with said pull line for operating the latter, and relatively stationary abutment means in the forward path of the machine for operating said trip to pull upon said pull line at the expiration of each plane irrigating operation, thereby turning said rock shaft and swinging said contact arms out of the paths of said driven contacts, said hook being constructed and arranged to release said rock shaft arm after each said turning of said rock shaft, and spring means for returning said hook to normal position and re-engaging it with said arm.

5. A structure as specified in claim 1; together with a ground engaging runner connected to said frame and extending under the delivery ends of said siphon tubes to prevent said ends from dragging upon the land planes and to elevate said delivery ends each time they must travel over a dike between land planes, said delivery ends of said siphon tubes each having an arched handle disposed over said runner, and a tie extending through all of said arched handles, the rear end of said tie being secured to the rearmost of said handles, the front end of said tie being secured to the front end of said runner.

6. An irrigation machine as set forth in claim 1, including a bar secured to and extending longitudinally of the frame for demountably supporting said siphon tubes, said bar extending under the crown portions of the arched siphon tubes and having longitudinally spaced seats in which said crown portions rest to support said siphon tubes with their inlet ends positioned for submersion in the ditch water and with their delivery ends positioned to overlie the land planes, and a ground engaging runner connected to said frame and extending under the delivery ends of said siphon tubes to prevent said ends from dragging upon the land planes and to elevate said delivery ends each time they must travel over a dike between land planes.

7. An irrigation machine as defined in claim 6, wherein the delivery ends of said siphon tubes each has an arched handle disposed over said runner, and a tie extending through all of said arched handles, the rear end of said tie being secured to the rearmost of said handles, the front end of said tie being secured to the front end of said runner.

References Cited in the file of this patent

UNITED STATES PATENTS

| | | |
|---|---|---|
| 487,881 | Newman | Dec. 13, 1892 |
| 628,127 | Shinn | July 4, 1899 |
| 766,454 | Masury | Aug. 2, 1904 |
| 898,847 | Dodson | Sept. 15, 1908 |
| 1,068,796 | Mathers | July 29, 1913 |
| 1,080,944 | Baker | Dec. 9, 1913 |
| 1,211,085 | Chandler | Jan. 2, 1917 |
| 1,716,448 | Langsdorf | June 11, 1929 |
| 2,468,453 | Mallentjer | Apr. 26, 1949 |
| 2,718,433 | Poyner | Sept. 20, 1955 |
| 2,756,098 | Rottcher | July 24, 1956 |